United States Patent
Bigelow

(10) Patent No.: US 6,815,953 B1
(45) Date of Patent: Nov. 9, 2004

(54) DETECTING FIELD DISTORTION IN UNDERGROUND LINE LOCATION

(75) Inventor: Russell N. Bigelow, Half Moon Bay, CA (US)

(73) Assignee: Metrotech Corporation, Sunnyvale, CA (US)

( * ) Notice: Subject to any disclaimer, the term of this patent is extended or adjusted under 35 U.S.C. 154(b) by 0 days.

(21) Appl. No.: 10/189,342

(22) Filed: Jul. 3, 2002

(51) Int. Cl.$^7$ .............................................. G01V 3/08
(52) U.S. Cl. ................................................... 324/329
(58) Field of Search ........................... 324/66, 67, 326, 324/327, 328, 329, 244; 342/459

(56) References Cited

U.S. PATENT DOCUMENTS

| | | | |
|---|---|---|---|
| 4,295,095 A | * 10/1981 | Thomas et al. | ............. 324/326 |
| 4,639,674 A | 1/1987 | Rippingale | ................... 324/326 |
| 4,672,321 A | * 6/1987 | Howell | ........................ 324/326 |
| 5,047,724 A | * 9/1991 | Boksiner et al. | ............. 324/520 |
| 5,117,377 A | * 5/1992 | Finman | ......................... 703/2 |
| 5,920,194 A | * 7/1999 | Lewis et al. | ................. 324/326 |
| 6,211,807 B1 | * 4/2001 | Wilkison | ...................... 342/22 |
| 6,215,888 B1 | 4/2001 | Eslambolchi et al. | ........ 382/100 |
| 6,529,006 B1 | * 3/2003 | Hayes | ......................... 324/326 |

* cited by examiner

Primary Examiner—Anjan Deb
Assistant Examiner—Reena Aurora
(74) Attorney, Agent, or Firm—Finnegan, Henderson, Farabow, Garrett & Dunner LLP

(57) ABSTRACT

An underground line locating receiver is disclosed which can determine whether the magnetic field it detects is representative of a line to be located or whether distortions in the magnetic field indicate an anomalous condition, and that therefore the reported line location measurement is suspect.

13 Claims, 4 Drawing Sheets

DETECTING FIELD DISTORTION IN UNDERGROUND LINE LOCATION

BACKGROUND

1. Field of the Invention

This invention relates to the field of electromagnetic field measurement devices, and in particular to devices for underground line location.

2. Discussion of Related Art

It is often necessary to locate buried lines, which are employed by numerous utility companies, in order to repair them, replace them or mark them to prevent their damage during excavation nearby. Examples of buried lines include pipelines for water, gas or sewage and cables for telephone, electrical power or cable television. Many of the lines are conductors, such as metallic pipelines or cables. In other applications, it is often useful to locate lines, such as power lines, that are concealed in the walls of buildings. It is well known to locate concealed lines by passing electrical current through them and detecting electromagnetic emissions that then emanate from them thereby.

A conducting conduit (a line) may be caused to radiate electromagnetically by being directly connected to an external transmitter or by being inductively coupled to an external transmitter. In some instances, such as with power lines, the line may radiate without an external transmitter.

A line locator detects the electromagnetic radiation emanating from the line. Early line locators included a single sensor that detects a maximum signal or a minimum signal, depending on the orientation of the sensor, when the line locator is passed over the line. Later line locators have included two or more sensors to provide information regarding proximity to the line.

Some line locators include two detectors oriented to measure magnetic fields in the horizontal direction (i.e., parallel with the surface of the earth) and arranged along a vertical axis. Typically, signals from these two detectors can be utilized to calculate the depth of the line. These line locators, then, detect the magnetic fields from the line to be located and display to an operator information about the location and/or depth of the line. A method of checking for a distorted field with such a locator is to make two measurements of the field while varying the height of the locator and compare the result. The first measurement is made with the locator at ground level. The second measurement is made with the locator at some given distance, for example six inches, above the ground. If the first measurement does not equal the second measurement plus the distance between the two measurements (e.g., six inches), then it is assumed that there is field distortion present and the measurement of depth is assumed to be suspect. Typically, methods of locating a line and determining its depth depend on the assumption that there is a single line of current along the line, that there are no other sources of electromagnetic fields, and that all responses are linear.

Problems in the depth measurements can arise when lines, other than the line being detected, interfere with the electromagnetic fields radiated by the target line. For example, other lines may become electrically coupled to the line being detected, either directly or inductively, and re-radiate unwanted electromagnetic fields. There may also be other conditions, which cause other electromagnetic fields, not originating from the line being measured, to be present in the location area such as anomalous soil conditions, metal structures, or ground water. These interfering fields or distortion of the magnetic field from the line being measured cause the line locator to incorrectly calculate the depth of the line. Since there is typically no indication of problems associated with the measurement, the operator may erroneously report the depth of the line and therefore either fail to locate the line or hit the line at too shallow a depth.

An incorrect measurement or a measurement on the wrong line can result in injury or damage. If a live power line is dug up by mistake, personnel can be injured and the line and equipment damaged. If a water line is dug into by mistake, the line can be damaged, and water leaking from the line can further cause damage. If a gas line, for example, is damaged during adjacent excavation, injury to persons and damage to property can occur.

Therefore, there is a need for a line locator capable of measuring the position and depth of a line and also of providing an indication of the validity of the measurement. The incorporation of such a feature in a locator could prevent harmful and costly damage to buried lines during nearby excavation.

SUMMARY OF THE INVENTION

According to the present invention, a line locator receiver determines whether a detected electromagnetic field is distorted or not. Distortion can be due to other lines in the ground, power sources, or other anomalies.

The electromagnetic field is measured at at-least three different points in space. In some embodiments this is accomplished using a line locator receiver that has three or more detectors at three or more different locations. In some embodiments making depth measurements, the detectors are spaced vertically. However, several detectors at several different positions may be used to make several measurements of an electromagnetic field.

Based on the measurements of the magnetic field at the detectors and a model of an expected field, an error term can be calculated from the measurements and compared to a threshold value. If the error term is larger than the threshold value, a warning is communicated to the operator, indicating that an unacceptable distortion of the magnetic field has been detected.

In some embodiments, many field measurements are made and mathematically processed to provide detailed information about the detected field. Based on the measurements and/or analysis, an operator can determine if a given depth or position measurement is likely to be accurate.

Therefore, by making and processing multiple field measurements, mistakes as to the position, nature, and depth of underground lines can be avoided, thus increasing safety and lowering the risk of damage.

These and other embodiments are further discussed below with respect to the following claims.

DETAILED DESCRIPTION

Figure 1:
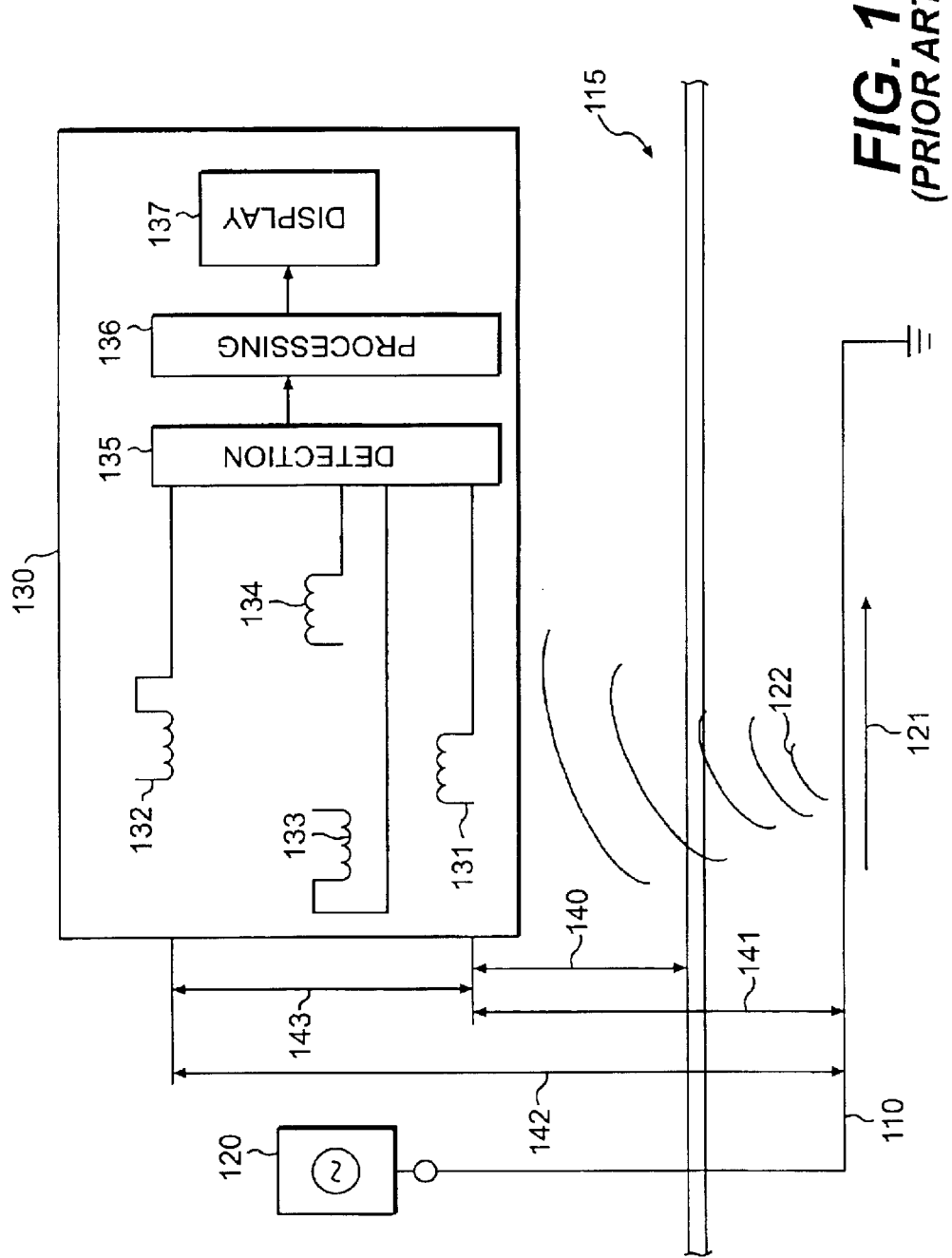
FIG. 1 is a schematic diagram of a line locator.

FIG. 1 shows a schematic diagram of a conventional line locator 130 positioned above a line 110. Transmitter 120 can be coupled to line 110 in order to induce current 121 to flow through line 110. Current 121 generates electromagnetic field 122, which is radiated from line 110. If current 121 is constant, field 122 is a static magnetic field. If current 121 is time varying, so is field 122. Electromagnetic field 122 penetrates ground 115 and exists above the surface, where it can be detected by coils 131 through 134.

Transmitter 120 is shown in a direct connection mode, i.e. transmitter 120 can be electrically coupled to line 110. The electrical connection can, for example, be accomplished at a point where line 110 emerges above the surface of ground 115. In some cases, transmitter 120 can also operate in inductive mode, where current 122 is induced in line 110 by electro-magnetic induction. In some cases, line 110 is already carrying a current, for example, A/C power at 60 Hz.

Line locator 130 detects the magnetic field at detectors 131 through 134. Detectors 131 through 134 in FIG. 1 are shown as coil type detectors, but any detector capable of measuring a magnetic field can be utilized. Detectors 131 through 134 are coupled to detection circuitry 135. Detection circuitry 135 receives signals from detectors 131 and 134 and provides amplification and filtering for those signals. In some cases, the signals may be digitized in detection circuitry 135. Processing circuitry 136 receives signals from detector circuitry 135 and performs operations to calculate depth and location of line 110 based on the magnetic fields measured at detectors 131 through 134. Processing circuitry 136 can be analog circuitry or can be a microprocessor. The results of the calculations can then be displayed to an operator on display 137.

Left right (directional) detection and electronic circuits applicable to line location are further described in U.S. application Ser. No. 09/136767, "Line Locator Having Left/Right Detection," to Gopal Parakulum and Stevan Polak, herein incorporated by reference in its entirety, and U.S. Pat. No. 6,130,539, "Automatic Gain Control for A line Locator," to Steven Polak, herein incorporated by reference in its entirety.

Referring again to FIG. 1, receiver 130 locates line 110 by detecting a radiated electromagnetic field 122. Some receivers contain pairs of electromagnetic field sensors (e.g. electric detectors) for determining depth and position of lines to be located. As an example, receiver 130 uses detectors 133 and 134 to determine lateral (i.e. horizontal) position and detectors 131 and 132 to determine depth. Each of detectors 131 through 134 generate signals in response to electromagnetic field 122. Detection electronics 135 generate signals for processor 136 based on the signals generated by detectors 131 through 134. Processor 136 compares the signals from detectors 133 and 134 to calculate lateral position of line 110 and processes the signals from detectors 131 and 132 to calculate distance to line 110. This information is sent to display 137 for the operator.

In order to locate line 110, an operator moves receiver 130 over ground 115 until line locator 130 communicates that the signals detected by detectors 133 and 134 are equal, indicating that line locator 130 is centered over the source of magnetic field 122, which is also the location of line 130.

To determine depth, receiving detectors 131 and 132 can be used to measure the strength of electromagnetic field 122 at two different distances, 141 and 142, from line 110. In some embodiments, the ratio of magnetic field strength in each of detectors 131 and 132 (which are a known distance 143 apart) can be used to calculate the distance to line 110.

The strength of magnetic field 122, B, as a function of current 122, i, flowing in (long) line 110 at distance 141, labeled d, is given in Equation 1 (see for example *Classical Electromagnetic Radiation*, Marion and Heald, pg. 433), assuming no distortion of electromagnetic field 122.

$$B \propto i/d \qquad [1]$$

Assuming that detectors 131 through 134 have linear responses, or the responses can be linearized in circuit 135, the output signal from an arbitrary one of detectors 131 through 134 is given by Equation 2. In Equation 2, i is the current 121 induced on line 110, distance $d_n$ is the vertical distance between the detector and line 110, response constant $k_n$ is a constant that includes the influence of receiver efficiency, gain, and all other detection parameters, and n indicates an arbitrary one of detectors 131 through 134.

$$s_n = k_n \cdot i/d_n \qquad [2]$$

In line locator 130 shown in FIG. 1, detector 131 is at a distance 141, or d, from line 110 and detector 132 is at a distance (d+a) from line 110. Detector 131 can have a response constant $k_1$ while detector 132 can have a response constant $k_2$. Using Equation 2, then, the ratio of signals from detector 131, $s_1$, to the signal from detector 132, $S_2$, is given by Equation (3).

$$\frac{s_2}{s_1} = \frac{k_2}{k_1}\frac{d+a}{d}. \qquad [3]$$

Defining $k_{12}$ to be the ratio of $k_2$ to $k_1$ (i.e., $k_2/k_1$) and solving for d yields Equation 4.

$$d = \frac{a}{k_{12}(s_1/s_2) - 1}. \qquad [4]$$

To allow locator 130 to determine an unknown distance d, the ratio $k_{12}$ can be determined during a calibration step and fixed. This calibration can typically be accomplished by making measurements on one or more current carrying lines 122 at known distances under known conditions. Because the distance d is known, a is the physical distance between the detectors, and $s_1$ and $s_2$ are measured, $k_{12}$ for a particular pair of detectors 131 and 132 can be calculated from Equation 5.

$$k_{12} \equiv \frac{k_2}{k_1} = \frac{s_2}{s_1}\frac{d+a}{d}. \qquad [5]$$

When distance 141 to line 110 is to be measured, receiver 130 is positioned over line 110. A measurement consists of recording signals $s_1$ and $s_2$ (from detectors 131 and 132 respectively). Equation 4 is then applied to solve for distance 141, d.

In a case where an expected electromagnetic field generated by a single line source was expected, that field is described by Equation 1, and has the form 1/r with distance r being the distance from line 110. A field not obeying this 1/r relationship would be considered distorted. In order to measure whether an electromagnetic field obeys the 1/r relationship for a single line source, at least three measurements of the electromagnetic field strength can be made for detectors positioned at different distances from line 110.

Figure 2:
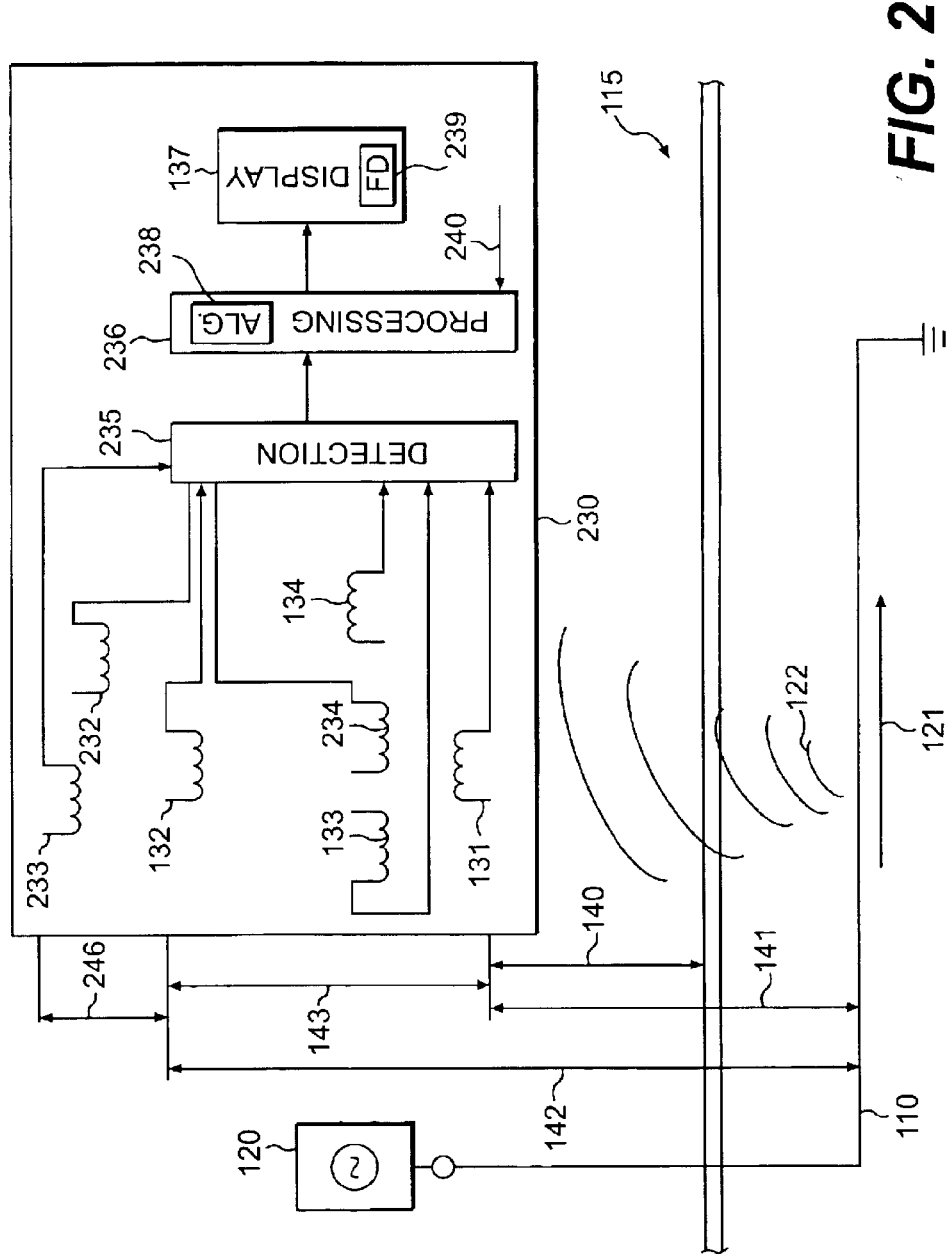
FIG. 2 is a schematic diagram of an embodiment of a line locator according to the present invention.

FIG. 2 shows a schematic diagram of an embodiment of line locator 230 according to the present invention. Line locator 230 shown in FIG. 2 includes at least three detectors 131, 132, and 233, to determine line depth and the accuracy of the measurement. Detector 233 can be locating in a line with detectors 131 and 132, at an additional distance 246 from detector 132. Detection electronics 235 includes a channel for amplifying the current signal from detector 233. Processor 236 not only calculates lateral position and depth, it includes algorithm 238 for producing an error function based on how well the signals from detectors 131, 132, and 233 fit to an expected relationship (for example Equation 1) that would be produced in response to a single line of current in line 110. Further, display 137 includes a field distortion indication 239. Additionally, display 137 may also include a user interface to communicate with processor 236. Processor 236 may include memory (for example flash memory or other non-volatile memory) for storing software program 238 in addition to data storage memory.

In some embodiments of the present invention, receiver 130 includes several additional detectors, such as for example detectors 232, 233, and 234, to aid in determining the shape of an arbitrary electromagnetic field. While detector 233 is shown above detectors 131 and 132, additional detectors, such as 232 and 234, can be used to make measurements at other points in space. Embodiments of line locator 130 can include any number of detectors from which different measurements of the distance between a point in line locator 130 and line 110 can be calculated.

Figure 3A:
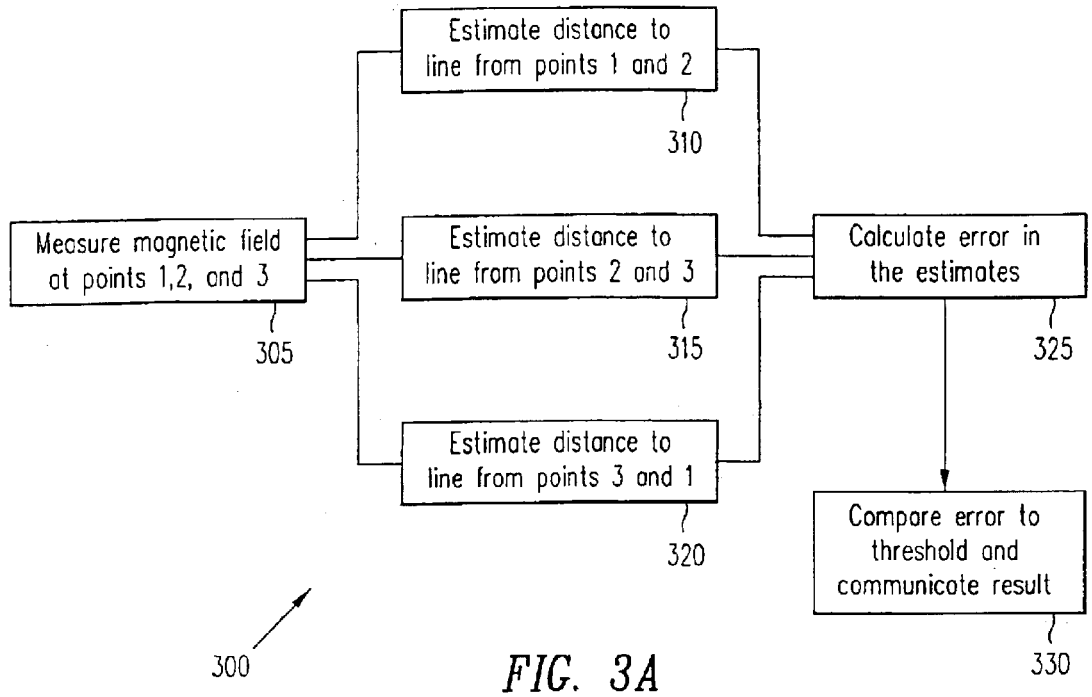
FIG. 3A is a diagram of a process to detect anomalous fields with a linear estimate according to the present invention.

FIG. 3A shows a block diagram of an algorithm 300 for determining whether the electromagnetic field in a location area as measured on line locator 130 originates from a single line of current, such as line 110, or is distorted by other influences. In step 305, measurements are made at at-least three locations, for example the locations of detectors 131, 132, and 233 in FIG. 2. In steps 310, 315, and 320, each possible combination of measurement data is used to calculate three different possible line depths using a model such as that described above in Equations (1) through (5). In some embodiments, more sophisticated modeling can be employed (for example, a model that anticipates distortion of the electromagnetic fields due to soil type, water content, or the presence of other interfering current carrying lines).

In the embodiment of line locator 230 shown in FIG. 2, three separate calculations of the distance 141, d, utilizing combinations of detectors 131, 132, and 233 can be given by $$d_{12} = \frac{a}{k_{12}(s_1/s_2) - 1},$$ [6]

$$d_{23} = \frac{b}{k_{23}(s_2/s_3) - 1} - a, \text{ and}$$ [7]

$$d_{13} = \frac{(a+b)}{k_{13}(s_1/s_3) - 1}.$$ [8]

In Equations (6) through (8), distance 246 (the distance between detectors 132 and 233) is b, distance 143 (the distance between detectors 131 and 132) is a, $s_1$ is the signal from detector 131, $s_2$ is the signal from detector 132, $s_3$ is the signal from detector 233, $k_{12}$ is the ratio of the response constants for detector 132 and detector 131 $k_2/k_1$, $k_{13}$ is the ratio of the response constants for detector 233 and detector 131 $k_3/k_1$, and $k_{23}$ is the ratio of the response constants for detector 233 and detector 132 $k_3/k_2$. The three calculated distances of d, $d_{12}$, $d_{23}$, and $d_{13}$, from the three combinations of detectors 131, 132, and 233 are then given by Equations 6, 7, and 8.

In step 325, the measurements are compared, and an error term is evaluated. In step 330, the error term generated from the measurements is compared to a threshold error value, and the result is communicated to the operator via distortion indication 239 of display 137.

In some embodiments of the present invention, for example the above three-measurement example, error term, Err, can be given by Equation 9. Some embodiments use other error analysis techniques (e.g., least squares fitting) to determine if the three measurements fit the profile of a cylindrically symmetric electromagnetic field, of the type that would be generated by a single line current or if a set of measurements fits a more complicated expected field.

$$Err = \sqrt{(d_{12} - d_{13})^2 + (d_{12} - d_{23})^2 + (d_{13} - d_{23})^2}.$$ [9]

The results of the error calculation in step 325 can be compared with a threshold value in step 330. After analyzing the measurement data, the result can be communicated to the operator in distortion indication 239, which can be a panel light, display, or any other fashion in display 137 of line locator 230. In some embodiments, the error result can be displayed on indication 239. In some embodiments, an indication of whether the error exceeds a threshold can be displayed.

In some embodiments, line locator 230 can include more than three detectors, or the detectors may not be positioned in a straight line. Several additional measurements using detectors at different points in space over line 110 can be utilized. It is also possible to have one detector perform multiple functions. For example, if the lateral position detectors 133 and 134 are not at the same elevation as the depth measurement detectors (e.g., detectors 131 and 132), one or more lateral position detectors could provide additional field measurements, provided by detector 233 in the above example.

Figure 3B:
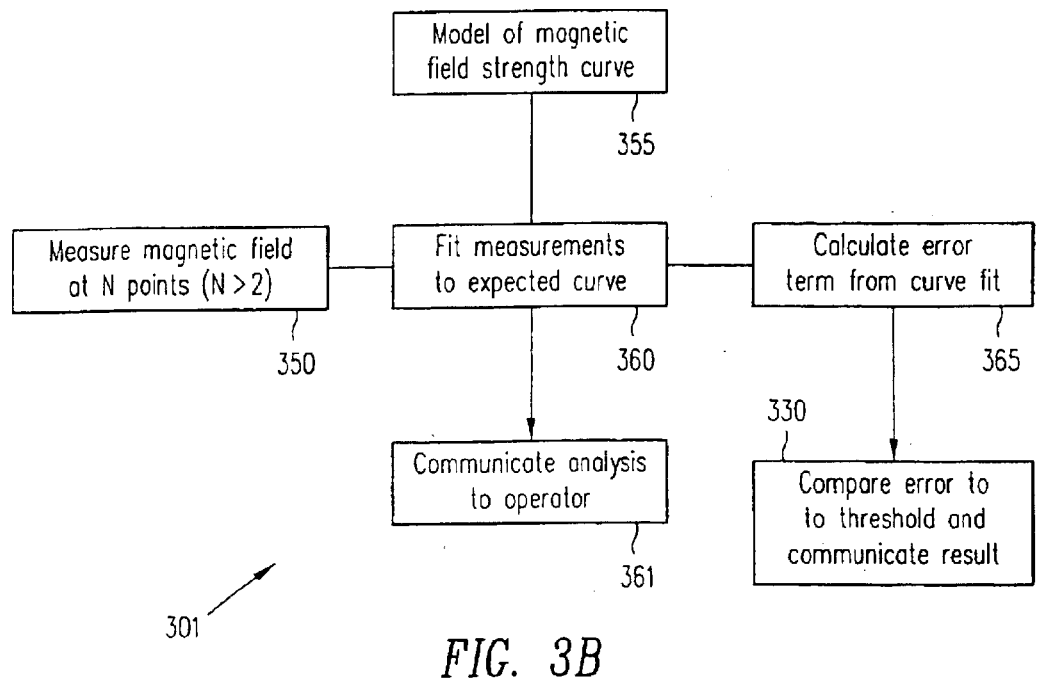
FIG. 3B is a diagram of a process to detect anomalous fields by regression according to the present invention.

FIG. 3B shows a diagram of a process where a curve-fitting method (e.g., linear regression as described in *Advanced Engineering Mathematics*, Kreyszig, pp 818–20, herein incorporated by reference in its entirety) produces a set of coefficients defining the electromagnetic field and an error function which can be used to determine an error value for comparison with a threshold.

In step 350, measurements of electromagnetic field strength are made at multiple different points in space, for example with detectors 131, 132, 233 and 234 of FIG. 2. Measurements are made at more than two detectors in order to measure discrepancies between the measured magnetic fields and those expected by the model magnetic field. In step 355, a model for an electromagnetic field is selected. Referring to FIG. 2, this selection can be done through an operator interface in display 137 or through an external input interface 240 to processor 136. The model may be as described by Equation 3, or a more complicated model (e.g., multiple lines of current, ground water, soil conditions). In some embodiments, a model is programmed into processor 236 of FIG. 2 through a user interface with display 137 or external interface 240.

In step 360, the set of measurements is mathematically fit to values calculated using the model of step 355. The distance calculated from the model of step 355 is displayed on display 239 in step 361. An error term, resulting from the fit, is calculated in step 365, and input to steps 330. In step 330, the error calculated in step 365 is compared with a threshold value and the result displayed on display 239.

The method shown in FIG. 3B can also be generalized to the application of any data-fitting process to determine whether an electromagnetic field is of any shape, not just cylindrically symmetric. In some embodiments, step 361 includes communicating parameters of a fit, the most likely cause of a distorted field, and other analysis from the electromagnetic field measurements to an operator. The models calculating parameters and other results can be executed on processor 236 and may be stored in memory 238.

Figure 4A:
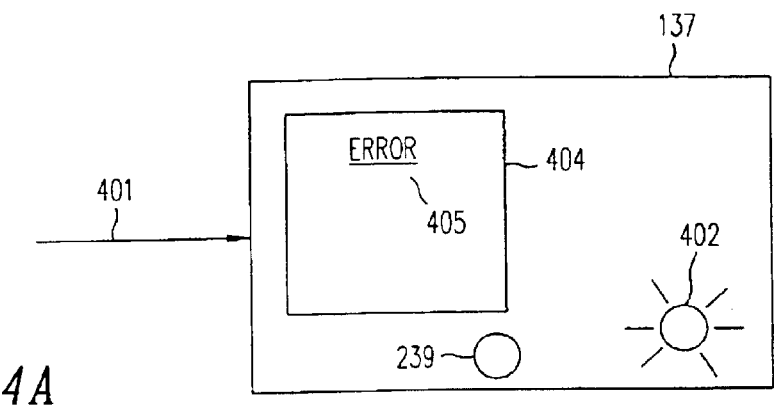
FIGS. 4A–4C are diagrams of an operator display according to the present invention.

FIG. 4A shows a diagram of an embodiment of operator display 137. In some embodiments, display 137 uses signal light 402, an alarm, or error message 405 (shown in graphics display 404) to communicate that the error term is larger than a threshold.

Figure 4B:
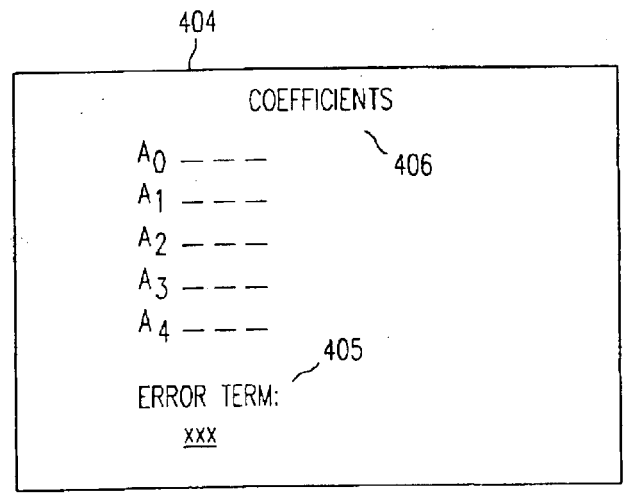

FIG. 4B shows a close up view of graphics display 404. In some embodiments processor 136 calculates coefficients of a polynomial or other mathematical fit of measurement data. Error term 405 and/or coefficients 406 can be accessed through graphics display 404.

Figure 4C:
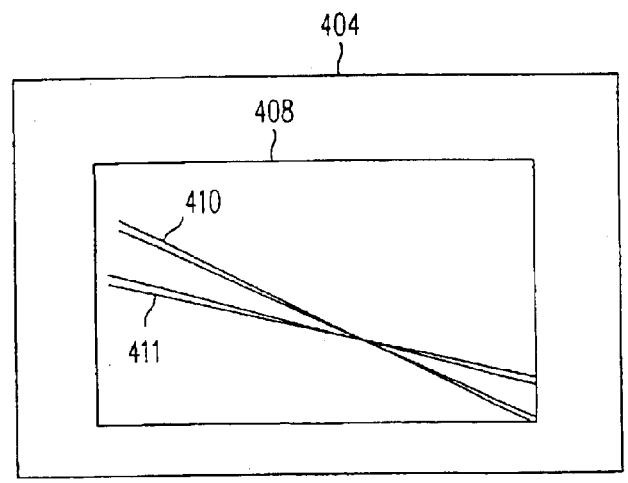

FIG. 4C shows a close up view of graphics display 404. In some embodiments, processor 136 can calculate a source distribution for the measured magnetic field. Graphics display 404 can be used to view picture 408 of calculated sources 410 and 411 of the electromagnetic field.

In some embodiments of the present invention receiver 130 measures complex and dynamic electromagnetic fields. In some embodiments, receiver 130 includes more than three detectors and takes many measurements over time and at many places in space so that the number of measurements is larger than the number of degrees of freedom in the model to which the measured field is to be compared.

Some embodiments make use of detecting technology that does not use detectors to make field measurements, such as magnetometers, antennas, and electro-optical devices. The invention also may be applied in embodiments detecting energies in optical, acoustical, or other types of fields, with detectors appropriate to those types of energy. The embodiments described above are exemplary only and are not intended to be limiting. One skilled in the art may recognize various possible modifications that are intended to be within the spirit and scope of this disclosure. As such, the invention is limited only by the following claims.

I claim:

1. A line locator receiver comprising:
   at least three electromagnetic field sensors;
   receiving electronics associated with said sensors, wherein said receiving electronics and said sensors are capable of making at least three measurements of an electromagnetic field and communicating said measurements;
   a processing device, capable of receiving said measurements from said receiving electronics, processing said measurements, and producing one or more parameters; and a display, capable of receiving said one or more parameters from said processing device, and communicating said one or more parameters to an operator, wherein said sensors are electric coils, wherein said processing device is capable of performing a linear regression based on the at least three measurements of said electromagnetic field and said one or more parameters include an
   error function, and wherein said regression produces a plurality coefficients and a portion of said coefficients are
   parameters communicated to said display.

2. The receiver of claim 1 wherein said coils are positioned in a line.

3. The receiver of claim 1, wherein said processor is capable of calculating at least three estimates of distance to an underground line to be located from at least three measurements and performs an error analysis on said estimates so calculated.

4. The receiver of claim 1, wherein said processing device is capable of performing a linear regression on at least three measurements of said electromagnetic field and said one or more parameters include an error function.

5. The receiver of claim 4, wherein said processor is capable of comparing said error function to a threshold value, and communicating a result to said display.

6. The receiver of claim 1, wherein said processor is capable of estimating a configuration of a source of said electromagnetic field, and communicating said estimate.

7. The receiver of claim 6, wherein said estimate is communicated as a visual display of said source.

8. The receiver of claim 1, wherein said display includes an audible or visual alarm.

9. A line locator receiver comprising:
   at least three electromagnetic field sensors;
   receiving electronics associated with said sensors, wherein said receiving electronics and said sensors are capable of making at least three measurements of an electromagnetic field and communicating said measurements;
   a processing device, capable of receiving said measurements from said receiving electronics, processing said measurements, and producing one or more parameters; and a display, capable of receiving said one or more parameters from said processing device, and communicating said one or more parameters to an operator, wherein said sensors are electric coils, wherein said processing device is capable of performing a linear regression on at least three
   measurements of said electromagnetic field and said one or more parameters include an
   error function, and wherein said processing device is capable of performing a mathematical fitting producing coefficients and an error term.

10. The receiver of claim 9, wherein said processor is capable of communicating said coefficients and said error term to said display.

11. A method of determining whether an electromagnetic field is distorted, comprising:
   making at least three measurements of an electromagnetic field at least three different points in space to produce a data set;
   performing a mathematical analysis of said data set, said analysis including fitting said data set to an expected model of said electromagnetic field; and
   calculating at least one parameter based on said analysis, wherein said at least three measurements are made by using a set of electric coils,
   wherein said expected model is an infinite straight line of current.

12. The method of claim 11, wherein said mathematical analysis consists of calculating a set of distances from said line of current to each of said electric coils of said set of electric coils, and inter-comparing said set of distances to produce an error term.

13. A method for determining whether a field containing energy conforms to an expected model of said field, comprising:
   making a plurality of measurements, representative of the energy in the field, wherein the number of said measurements is greater than degrees of freedom in an expected model, so as to produce a set of data;
   performing a mathematical fitting of said set of data to said mathematical model, including producing at least an error term;
   comparing said error term to a threshold value; and
   indicating a distortion in the field when the error term exceeds the threshold value.

* * * * *

UNITED STATES PATENT AND TRADEMARK OFFICE
CERTIFICATE OF CORRECTION

PATENT NO.    : 6,815,953 B1
DATED         : November 9, 2004
INVENTOR(S)   : Russell N. Bigelow It is certified that error appears in the above-identified patent and that said Letters Patent is hereby corrected as shown below:

Column 7,
Line 58, replace "plurality coefficients" with -- plurality of coefficients. --.

Signed and Sealed this

Twenty-third Day of August, 2005

JON W. DUDAS
*Director of the United States Patent and Trademark Office*